US008997936B1

(12) United States Patent
Roys

(10) Patent No.: US 8,997,936 B1
(45) Date of Patent: Apr. 7, 2015

(54) ENVIRONMENTAL COMPRESSOR PROTECTION ASSEMBLY

(75) Inventor: Curtis Roys, Midland, TX (US)

(73) Assignee: Compressor Products International LLC, Stafford, TX (US)

( * ) Notice: Subject to any disclaimer, the term of this patent is extended or adjusted under 35 U.S.C. 154(b) by 0 days.

(21) Appl. No.: 13/312,691

(22) Filed: Dec. 6, 2011

Related U.S. Application Data

(63) Continuation of application No. 11/867,487, filed on Oct. 4, 2007, now Pat. No. 8,069,950.

(60) Provisional application No. 60/849,556, filed on Oct. 4, 2006.

(51) Int. Cl.
F01M 1/00 (2006.01)
F01M 1/16 (2006.01)

(52) U.S. Cl.
CPC .......................................... F01M 1/16 (2013.01)

(58) Field of Classification Search
USPC .......................................... 184/6.16; 137/467
See application file for complete search history.

(56) References Cited

U.S. PATENT DOCUMENTS

| 1,891,119 | A | * | 12/1932 | Stover | 137/467 |
|---|---|---|---|---|---|
| 2,490,219 | A | | 12/1949 | Kmiecik | |
| 2,676,782 | A | * | 4/1954 | Bostock et al. | 137/516.29 |
| 2,973,776 | A | | 3/1961 | Allen | |
| 2,973,777 | A | | 3/1961 | Troxell, Jr. | |
| 3,038,557 | A | | 6/1962 | Callahan | |
| 3,229,713 | A | | 1/1966 | Wiegand | |
| 3,395,722 | A | * | 8/1968 | Heinrich | 137/115.2 |
| 3,409,037 | A | | 11/1968 | Nelson | |
| 3,698,424 | A | | 10/1972 | Wiegand | |
| 3,951,042 | A | | 4/1976 | Weiss | |
| 4,028,010 | A | | 6/1977 | Hopkins | |
| 4,178,960 | A | * | 12/1979 | Napolitano et al. | 137/494 |
| 4,467,892 | A | * | 8/1984 | Van de Bogert | 184/7.4 |
| 4,469,125 | A | * | 9/1984 | Keeney | 137/467 |
| 4,546,791 | A | * | 10/1985 | Huang | 137/512 |
| 4,766,923 | A | | 8/1988 | Roper | |
| D321,928 | S | | 11/1991 | Milo | |
| 5,183,134 | A | * | 2/1993 | Kuc | 184/6.16 |
| D339,399 | S | | 9/1993 | Lin | |
| 5,351,714 | A | | 10/1994 | Barnowski | |
| D364,210 | S | | 11/1995 | Loerop et al. | |
| D370,963 | S | | 6/1996 | Daansen | |
| 5,810,115 | A | | 9/1998 | Mismas | |
| 5,835,372 | A | | 11/1998 | Roys et al. | |
| D426,617 | S | | 6/2000 | Hansen | |
| 6,095,760 | A | | 8/2000 | Houtman | |

(Continued)

Primary Examiner — William E Dondero
Assistant Examiner — Mark K Buse
(74) Attorney, Agent, or Firm — Perkins Coie LLP

(57) ABSTRACT

A compressor lubrication system including a positive displacement pump, a pressure relief valve assembly, and a divider block. The pressure relief valve assembly includes a housing that has an opening to the fluid distribution system and a relief passage. A conduit is connected from the relief passage to a fluid reservoir. The assembly also includes a pressure relief valve that has an open position in which fluid from the fluid distribution system can enter the relief passage, and a closed position in which fluid is prevented from entering the relief passage. A biasing element maintains a biasing force on the pressure relief valve. The pressure relief valve is maintained in the closed position when the biasing force exceeds the fluid force on the pressure relief valve and the pressure relief valve moves into the open position when the fluid force exceeds the biasing force.

8 Claims, 7 Drawing Sheets

(56) References Cited

U.S. PATENT DOCUMENTS

| | | |
|---|---|---|
| D432,006 S | 10/2000 | Hussaini |
| D470,066 S | 2/2003 | Christiansen |
| 6,527,085 B1 * | 3/2003 | Paczuski .................. 184/6.16 |
| D496,091 S | 9/2004 | Katzman et al. |
| 7,117,885 B2 | 10/2006 | Lazzara et al. |
| D597,630 S | 8/2009 | Easton |
| 2004/0168725 A1 | 9/2004 | Lazzara et al. |
| 2006/0071189 A1 | 4/2006 | Cornwell et al. |

\* cited by examiner

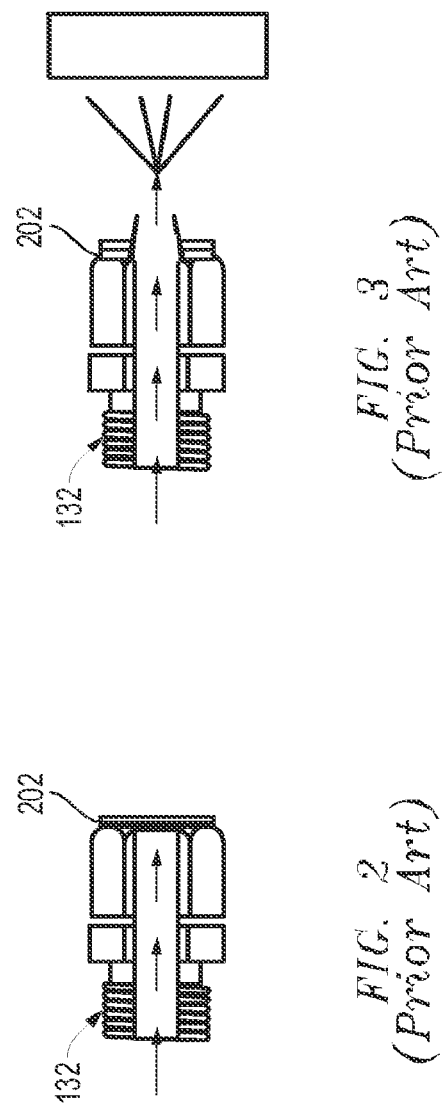

ENVIRONMENTAL COMPRESSOR PROTECTION ASSEMBLY

This application is a continuation of application Ser. No. 11/867,487, filed Oct. 4, 2007, U.S. Pat. No. 8,069,950, which claims the benefit of U.S. Provisional Application No. 60/849,556, filed Oct. 4, 2006, the disclosures of which are incorporated herein by reference.

TECHNICAL FIELD OF THE INVENTION

The present invention relates to pressure relief systems for positive displacement fluid distribution systems, such as high pressure, low volume systems used to deliver lubricant to natural gas compressors.

BACKGROUND OF THE INVENTION

Compressors and other machines use lubricants distributed by lubrication systems to reduce internal friction between parts by injecting the lubricant, such as oil or grease, into critical bearing surfaces and reciprocating parts junctions.

FIG. 1 shows a schematically typical lubrication system 100 for natural gas compressors 101. Such systems typically include a high pressure, low volume, positive displacement oil pump 102 including a lubricator gear box 104 that drives multiple lubricator pump roller rocker assemblies 106. Fluid is supplied to the system from a low pressure oil supply 108. Pressure valves 110, one for each roller rocker assembly 106 indicate the pressure at the pump outlets. The lubricant is pumped to divider blocks 120, each having multiple outlets 122 to distribute a desired amount of lubricant to lubricated equipment, such natural gas compressors 101, shown schematically without connections to divider blocks 120. The fluid pressure at the outlet of pump 102 is typically greater than about 500 psi, and the volume dispensed is typically less than about 10 or 15 gallons per day.

If a blockage occurs in the lubrication system, the positive displacement nature of the pump can cause a dramatic increase in the pressure in the lubrication system 100, which can cause components in the lubrication system to fail. Non-positive-displacement-pump lubrication systems, such as systems that use centrifugal or diaphragm pumps, are not as susceptible to damage from over pressure conditions. To prevent high pressure from damaging equipment in lubrication system 100, compressor lubrication systems typically include atmospheric rupture assemblies 132 as pressure relief devices. FIGS. 2 and 3 show a typical atmospheric rupture assembly 132. FIG. 2 shows that atmospheric rupture assembly 132 includes a metal disc 202 that prevents fluid flow under normal operating conditions but that ruptures when the pressure in the system 100 exceeds a certain value, venting the lubricant to atmosphere as shown in FIG. 3. If the flow of lubricant is interrupted, compressors and other industrial tools can be seriously damaged or destroyed. The rupture of the disk 202 of atmospheric rupture assembly 132 causes such an interruption of lubricant flow. To protect the equipment, a sensor on a "no-flow device" (not shown) is typically used to detect this loss of lubricant flow, and to trigger an alarm and eventual shutdown of the lubricated equipment.

Release of lubricant at very high pressures (up to about 7400 psi) to the atmosphere raises housekeeping, safety, and environmental concerns. After the initial rupture of the metal disc 202, lubricant is released onto the compressor frame and skid. The lubricant continues to flow until the compressor 130 is shut down by a lubricant no-flow device sensor device. The duration of continued flow varies from about a three minute interval for a digital no-flow device to about a twenty minute interval with an old style mechanical no-flow device. The resulting oil spill can be of significant size, is virtually impossible for the operator in the field to clean up, and raises environmental concerns.

Atmospheric rupture assemblies also raise safety concerns for workers in the area of the equipment. It is common for an operator to be near the compressor skid, monitoring pressure on a pressure gauge. The pressure gauge and lubricator pump are always in the same location as the atmospheric rupture assembly 132. The rupture of such assemblies has resulted in operators being struck by the high pressure lubricant and injured by pieces of the aluminum disc which blew out of the assembly when it ruptured.

Another problem with atmospheric rupture assemblies 132 is that they allow operators to insert more than one rupture disc 202. The installation of more than one rupture disc 202 in an assembly designed for a single rupture disc increases the pressure require to vent the system. Even with a blockage, the lubrication system may not be capable of achieving sufficient pressure to rupture multiple disks. This is a serious concern for the protection of the compressor components because the increased pressure may cause the divider block components and tubing to fail. If the excessive pressure is not relieved by the atmospheric rupture assembly, the compressor will continue to operate, potentially destroying the internal cylinder and rod packing components. The cost of replacement parts and lost production can be thousands of dollars.

Thus, while atmospheric rupture assemblies normally protect against high pressure damage, they have numerous shortcomings. Therefore, there is a need for a compressor protection assembly that reliably protects against excessive lubricant pressure without housekeeping, environmental, safety, and operating concerns

SUMMARY OF THE INVENTION

An object of the invention is to provide protection against excessive pressure in a high pressure, low volume fluid distribution system.

The current invention provides a pressure relief system that allows fluid in a system using a positive displacement pump to flow to a safe location if the pressure in the system exceeds predetermined value. In preferred applications, when a lubrication system is over pressurized, the lubricated equipment is shut down, directly or indirectly, by a protection device and cannot be restarted until the problem is corrected. The problem in the system preferably must be corrected by an operator or mechanic before the system can be restarted. Normal fluid flow is not restored automatically when the pressure drops, thereby allowing an operator to investigate and correct the source of the problem before normal operating fluid flow is restored.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims

BRIEF DESCRIPTION OF THE DRAWINGS

For a more complete understanding of the present invention, and the advantages thereof, reference is now made to the following descriptions taken in conjunction with the accompanying drawings, in which:

FIG. 2 illustrates a typical prior art atmospheric rupture assembly in a normal operating mode.

FIG. 3 illustrates the typical prior art atmospheric rupture assembly of FIG. 2 after the disc has ruptured.

DETAILED DESCRIPTION OF PREFERRED EMBODIMENTS

Figure 1:
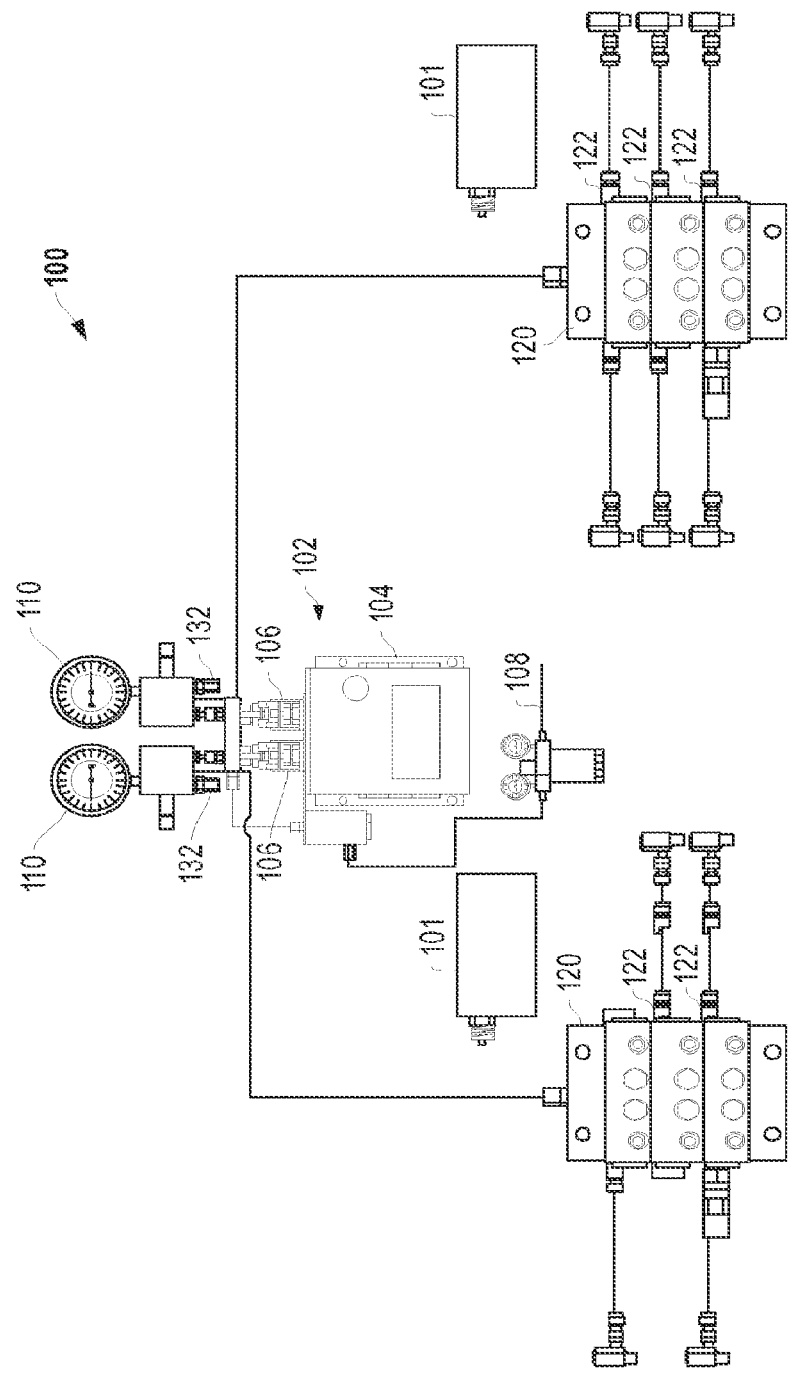
FIG. 1 shows schematically a typical prior art lubrication system for a natural gas compressor, using an atmospheric rupture assembly for pressure relief.

Embodiments of the current invention eliminate environmental contamination from oil spills on compressor skids; protect compressor operators from possible injury caused by high pressure oil squirting from a blown rupture disc; prevent compressor component failure by opening at specified pressure; contain a visual indicator that notifies compressor operators of system overpressure conditions; remain in the open position until reset by an operator; and can be set to different opening pressures.

A typical embodiment of the pressure relief system is referred to as an Environmental Compressor Protection Assembly ("EPRT™") or a Pop Open Pressure Relief ("POPR™") valve. Embodiments of the pop open pressure relief valve are typically used in lubrication systems that include positive displacement pumps and that provide a relatively low volume of lubricant at a relatively high pressure. During normal operation, a pop open pressure relief valve is closed. When a specified pressure is exceeded, the relief valve opens to a fully open position routing high pressure fluid through a relief passage to a safe location, such as the lubrication reservoir or the compressor crankcase. The relief valve preferably remains fixed in the open position once opened, and a visible indicator shows an operator that the valve has opened. This "fixed open" state assures the operator that the compressor will be shut down by the existing lubricant no-flow device, that is, the device that senses that no lubricant is flowing and automatically shuts down the compressor. The relief valve preferably cannot open at high pressure and then automatically reset to close when the system pressure is reduced, as relief valves currently known to the industry operate, if the relief valve remains partly open or closes automatically after the pressure is relieved in the system, the cause of the over pressure condition could remain undiscovered and cause equipment failure. In a preferred design the relief valve remains open until manually closed. This operation essentially prevents any lubricant from flowing to the compressor, the compressor will remain shut down until the blockage in the system is fixed and the operator resets the relief valve to the normal closed position. The invention protects the environment, the operator, and the compressor equipment in the event of lubricant overpressure.

In a first embodiment, the POPR valve assembly includes a housing that connects to the fluid distribution system and includes a relief passage to route fluid when the system pressure exceeds a predetermined value. A relief valve mechanism includes a piston that is slidable within the housing. The piston has an open position in which fluid from the fluid distribution system can enter the relief passage, and a closed position in which fluid from the fluid distribution system is prevented from entering the relief passage. A biasing element maintains a force on the piston to keep it in the closed position when the biasing force on the piston exceeds the fluid force on the piston. When the system pressure exceeds a predetermined value, the fluid force on the piston exceeds the spring force on the piston and the piston moves into the open position. A catch keeps the piston in the open position once it has been moved to the open position by the florid pressure. A visible indicator to indicate to an observer when the piston is in the open position.

Figure 4:
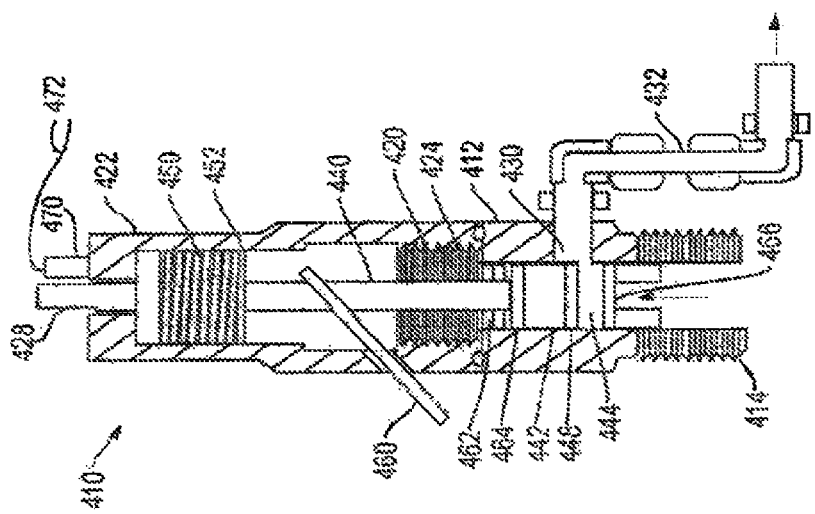
FIG. 4 illustrates an embodiment of an environmental compressor protection assembly in a normal operating mode.
Figure 5:
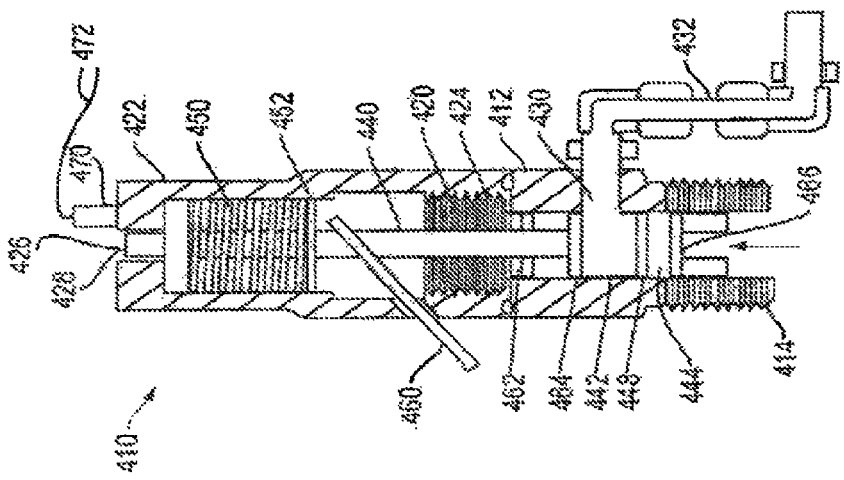
FIG. 5 illustrates the embodiment of FIG. 3A after it has reacted to an over pressure in the system.

FIGS. 4 and 5 show a first embodiment of a POPR assembly 410, including a piston 442, a spring 450, a relief passage 430, a conduit 432 connecting the relieved lubricant to a fluid reservoir, such as external tank or a compressor crankcase (not shown), a retaining lever 460, and an indicator 428. FIG. 4 shows the normal operating position in which the relief path is blocked, FIG. 5 shows the over-pressure position in which the relief path is open.

The first embodiment of the POPR 410 comprises a two-section housing assembly, including a first housing section 412 having a first threaded end 414 that screws into a component (not shown) of the lubrication system, and a second threaded portion 424 for connecting a second housing section 422. The second housing section 422 includes internal counterpart threads 420 for attaching the second threaded portion 424 of the first housing section 412, and an opposing end having an opening 426 from which the indicator 428 can protrude to indicate that the valve has opened. The POPR 410 includes a shaft 440 that extends within housing sections 412 and 422. The piston 442 attached to the shaft 440 in the first housing section 412 moves about an internal passage 444 of the first housing section 412. The piston 442 and an o-ring 448 prevent the lubricant from entering the relief passage 430.

As shown in FIG. 4, during normal operation, the piston 442 is pushed down by the pressure of the spring 450. The spring 450 inside the second housing section 422 is maintained in position by a disc 452 that is not free to slide downward on the shaft 440. The spring 450 pushes against the disc 452, which exerts a force on the shaft 440 to keep the piston 442 in the closed position.

When blockage takes place in the system, the pressure gradually builds until the spring pressure is overcome. As shown in FIG. 5, when the lubricant pressure exceeds the exerted pressure of the spring 450, the piston 442 moves further into the first housing section 412, forcing the disc 452 up and compressing the spring 450, exposing the internal passage 444 to the relief passage 430 between the lubrication system and the conduit 432 which connects to a fluid reservoir. The term "fluid reservoir," used to indicate any enclosure in which the lubricant or other fluid can be directed, as opposed to the prior art in which the lubricant is discharged onto the ground. A fluid reservoir can include, for example, external tank, a container, or a compressor crankcase (not shown). A conduit 432, such as a tube or a pipe, is connected to the relief passage 430 using various fittings. The pressure required to open the internal passage 444 to the relief passage 430 depends on the force of spring 450. Therefore, the set pressure can be changed by installing a spring 450 with a different spring constant, that is, a stiffer or weaker spring. Additional O-rings 462, 464, and 466 seal the unit and prevent lubricant or contaminants from entering.

A visual indicator notifies the operator of the blockage and/or over-pressure condition of the system. This blockage can occur in the divider valve, check valves, tubing lines or injection points of the fluid distribution system. In one embodiment, an indicator 428 on the end of the shaft 440 protrudes though the opening 426 in the second housing section 422, indicating to an operator that the POPR 410 has opened. FIG. 4 shows the POPR 410 in the normal closed position, with the indicator 428 hidden inside the opening 426. FIG. 5 shows the POPR 410 in the open position, with the indicator 428 protruding through the opening 426. In an alternate embodiment, as shown in FIGS. 6 and 7, a cap rises to indicate that the valve has opened.

As shown in FIGS. 4 and 5, the shall 440 passes through the retaining lever 460, which allows the shaft 440 to move in the direction of opening the valve, but prevents the shaft 440 from moving back to close the valve again after the pressure in internal passage is reduced. The retaining lever 460 provides a frictional force that is counter to and greater than the force from spring 450. Thus, once the valve has opened, it will remain open until serviced by an operator. This open at assures the operator that the compressor will be shut down by the lubricant no-flow device (not shown). As such, the compressor cannot operate until the blockage in the system is fixed and the retaining lever 460 is manually lifted by the operator to enable the lubricant to flow through the system. When the operator lifts the retaining lever 460, the frictional pressure on the shaft 440 is released. Under pressure from the spring 450, piston 422 moves to close relief passage 430 and restore fluid flow to the lubricated equipment. The POPR 410 is thus reset to the default closed position as shown in FIG. 4, with the visual indicator 428 disappearing inside the opening 426 of the assembly.

Some embodiment of the invention depends on a separate lubrication system no flow device to shut down the compressor after the valve opens to divert the lubricant. In other embodiments, the opening of the valve itself activates a switch to shut down the lubricated equipment. For example, a micro switch 470 at the top of the POPR valve 410 may communicate to a compressor control panel via a wire 472 or by a wireless connection, such as an infrared or radio frequency connection. When the POPR valve opens, the movement of the valve components can activate the switch 470 to send a signal to the control panel causing the compressor to be immediately shut down. Such embodiments can provide an immediate shut down of the compressor when the lubricant flow stops and eliminates dependence on the no-flow device in the hydraulic system to indicate an alarm and shut down the compressor. These embodiments also provide a redundant shutdown protocol if either of the shutdown devices fails to operate correctly. A preferred switch could be incorporated into the valve body or, like switch 470, added externally onto the valve housing, depending on the application. Any suitable switch could be used, for example, Hall effect sensor or reed switch that is activated by a magnet on the piston or another moving part or a switch that is activated by the moving valve components making or breaking an electrical contact or optical connection, keeping in mind that any switch may need to be explosion proof, depending on the environment in which the switch is used. It is preferably that the compressor shuts down immediately when the flow of lubricant to the compressor components is interrupted, rather than waiting for the lack of flow to be sensed by a separate no flow sensor.

Figure 6:
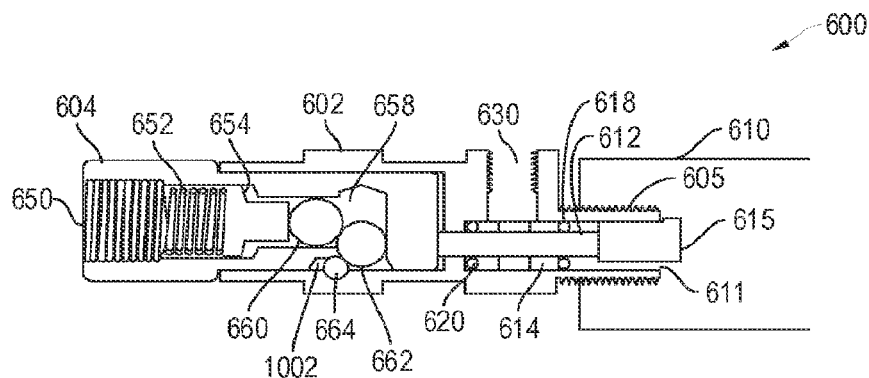
FIG. 6 illustrates an alternate embodiment of an environmental compressor protection assembly in a normal operating mode (relief valve closed), in which a cap, rather than an indicator pin, rises to indicate that the valve has opened.
Figure 7:
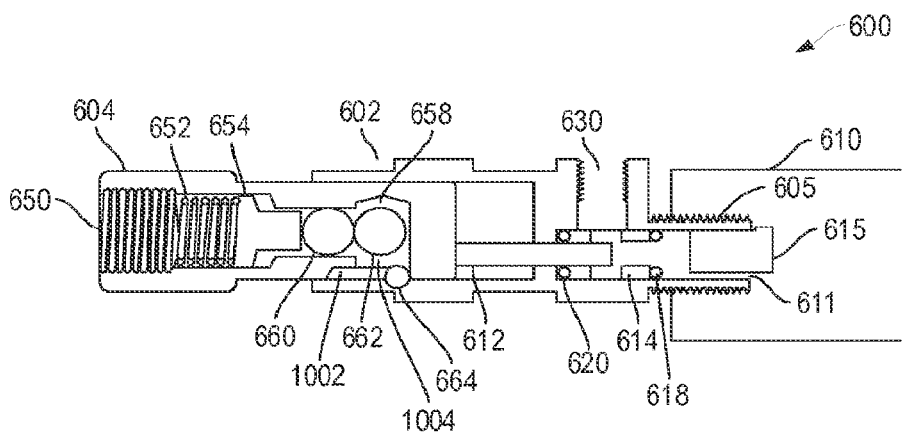
FIG. 7 illustrates the alternate embodiment of FIG. 6 after it has reacted to an over-pressure in the system (relief valve open).
Figure 8:
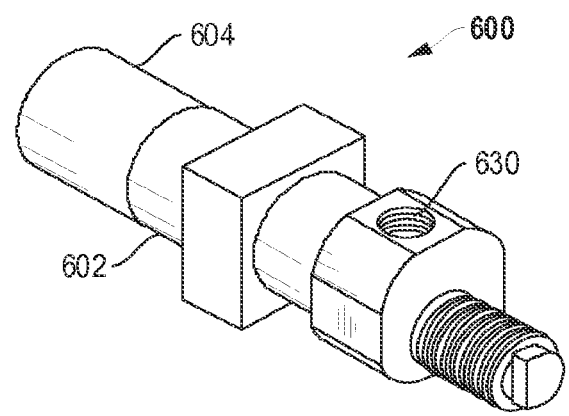
FIG. 8 shows a pictorial view of the closed valve shown in FIG. 6.
Figure 9:
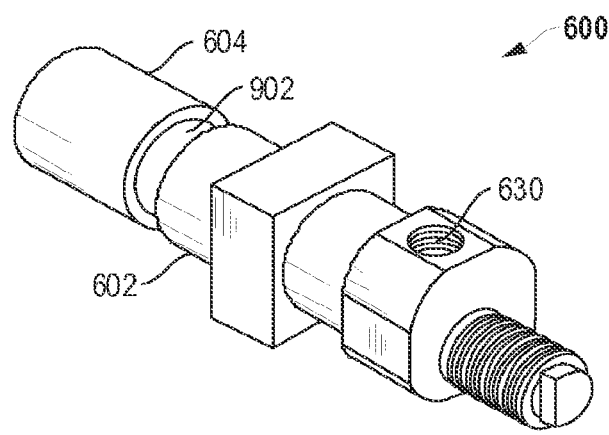
FIG. 9 shows a pictorial view of the open valve shown in FIG. 7.
Figure 10:
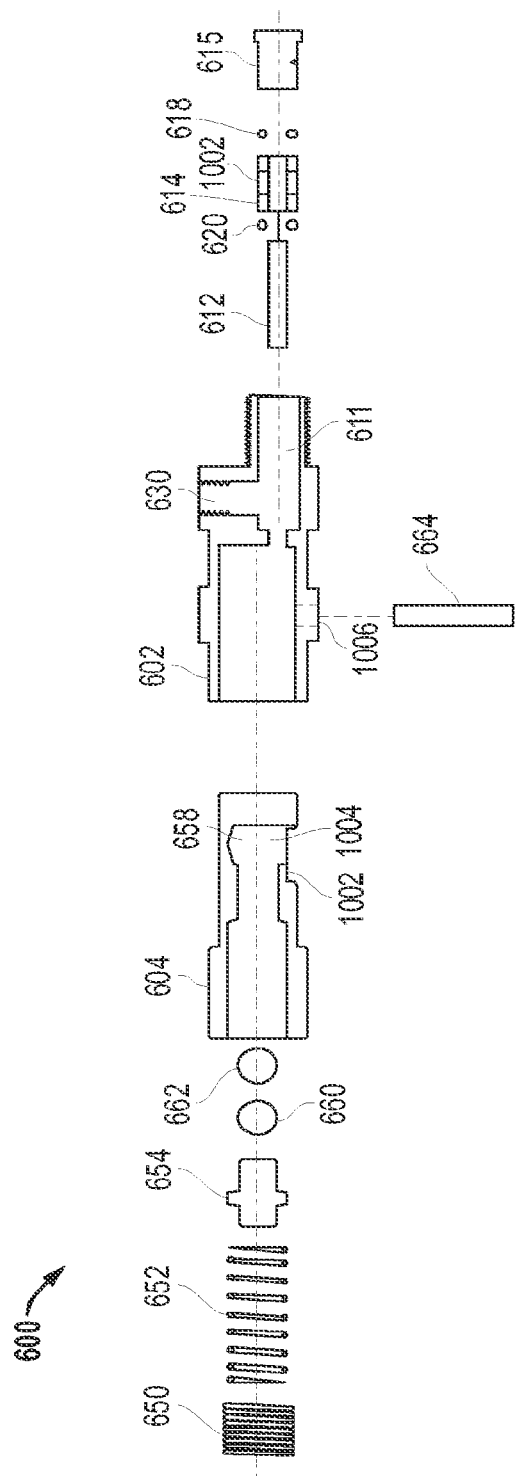
FIG. 10 shows an exploded view of the valve of FIGS. 6-9.
Figure 11:
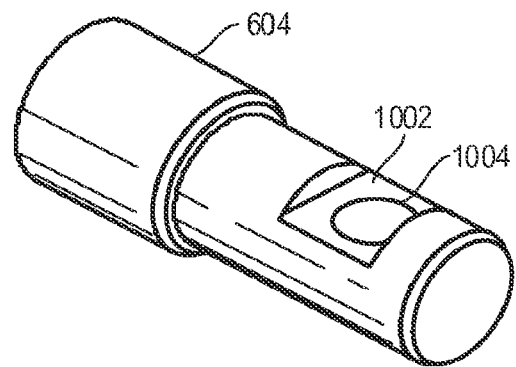
FIG. 11 shows a pictorial view of the end cap of FIGS. 6-10.
Figure 12:
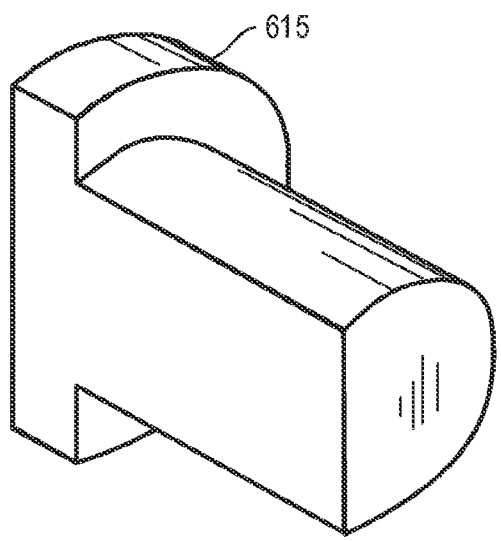
FIG. 12 shows a pictorial view of the end plug of FIGS. 6-10.

FIGS. 6-12 show an alternative embodiment of a POPR valve 600, with FIGS. 6 and 8 showing the POPR valve 600 in the closed position and FIGS. 7 and 9 showing the POPR valve 600 in the open position. FIG. 10 shows an exploded view of the POPR valve 600. POPR valve 600 includes a main housing 602 and an end cap 604. FIG. 11 shows a pictorial view of end cap 604. As shown in FIGS. 6 and 7, main housing 602 includes a hollow male threaded end 605 that is threaded into a lubrication system component 640 and provides an inlet 611 for high pressure fluid. The high pressure fluid exerts a force against a piston 612 that can slide within a hollow cylindrical sleeve 614, Press fit end cap 615, in the shape of a plug with a longitudinal slice removed (FIG. 12), keeps piston 612 within housing 602 while allowing fluid to enter inlet 611, O-rings 618 and 620 provide seals around piston 612 on either end of sleeve 614. A hole 1002 (FIG. 10) through sleeve 614 perpendicular to the sleeve's long axis allows fluid to escape through relief path 630 when the incoming fluid pressure forces piston 612 past o-ring 618 and sufficiently far to open a path from inlet 611 to escape path 630. Like relief passage 430 of the embodiment of FIGS. 4 and 5, relief path 630 connects to a fluid reservoir external tank, a container, or a compressor crankcase (not shown) so that the fluid is not sprayed out into the environment, as happens with prior art rupture valves. A biasing force maintains the piston 612 extending beyond o-ring 618 during normal operating conditions, sealing off relief passage 630.

End cap 604 includes a mechanism to maintain POPR valve 600 in the open position after an over pressure condition occurs and to provide a visual indicator to the operator that the valve has been opened. When piston 612 moves to open a passage to relieve path 630, the piston pushes end cap 604 partly out of main housing 602. The portion 902 (FIG. 9) of end cap 604 that is exposed when end cap 604 is displaced is preferably brightly colored so that an operator can readily see that the end cap 604 has been displaced. A plug 650 is threaded into end cap 604 to trap a spring 652 and a spring holder 654 in end cap 604, A cavity 658 in end cap 604 includes within it balls 660 and 662.

As shown most clearly in FIGS. 10 and 11, end cap 604 includes in its outer diameter a flat indentation 1002 through which extends a hole 1004, having a diameter slightly larger than that of balls 660 and 662. After end cap 604 is inserted into main housing 602, a dowel pin 664 is inserted into a hole 1006 (FIG. 10) in main housing 602. Dowel pin 664 fits within indentation 1002, trapping end cap 604 within housing 602. Under normal operating pressures, spring 652 presses spring holder 654 against ball 660, which forces ball 662 partly into hole 1004. End cap 604 is maintained in the closed position by the pressure of spring 652 forcing, via spring holder 654 and ball 660, ball 662 into hole 1004, where ball 662 is pegged behind dowel pin 664.

If the pressure in lubrication system component 640 exceeds a predetermined value, the force exerted on end cap 604 by piston 612 is sufficient to force ball 662 out of hole 1004 and over dowel pin 664, thereby pushing end cap 604 partly out of main housing 602 as shown in FIGS. 7 and 9 and into an open position. Dowel pin 664, which extends though indentation 1102 in end cap 604, prevents end cap 604 from sliding completely out of main housing 602. With the end cap partly extending out of main housing 602, ball 662 is no longer positioned over hole 1002 and trapped behind dowel pin 664. The spring force is this acting entirely within end cap 604 and not against the dowel pin 664 or main housing 602, so there is no force tending to return piston 612 to its original position to close the relief passage 630.

An operator can reset the valve to the closed position by pushing end cap 604 back into housing 602. Pushing end cap 604 will cause the hole 1004 to move behind the dowel pin 664 and ball 662 will drop into the hole 1004, and then be held in place by the spring force via spring holder 654 and ball 660, whose force on ball 662 includes a downward component that keeps ball 662 extending into hole 1004. Although not shown in FIGS. 6 and 7, a switch similar to switch 470 can also be used on the embodiments shown in those figures.

It will be understood that the invention includes more than one novel aspect. Different embodiments can be constructed for different purposes using any of, or combinations of, the different aspects of the invention, and not all the advantages of the invention are, therefore, necessarily achieved by every embodiment that is within the scope of the attached claims.

Although the present invention and its advantages have been described in detail, it should be understood that various changes, substitutions and alterations can be made herein without departing from the spirit and scope of the invention as defined by the appended claims. For example, rather than o-rings forming a seal around the piston, the piston could press against a metal or an elastic sealing surface in the closed position. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A natural gas compressor high pressure, low volume lubrication system, comprising:
    a positive displacement pump operative to supply a low volume of a lubricant under high pressure, where the low volume is less than 15 gallons per day and the high pressure is greater than 500 pounds per square inch;
    a pressure relief valve assembly being repeatedly movable between an open and a closed position including:
        a housing having an inlet opening exposed to the lubricant in fluid communication with the positive displacement pump and having a relief passage separate from the inlet;
        a conduit extending from the housing connecting the relief passage to an enclosed fluid reservoir;
        a pressure relief valve comprising a piston to move within the housing, at least one seal to inhibit lubricant from leaking around the piston, and a rod, the pressure relief valve having an open position in which the lubricant from the positive displacement pump can enter the relief passage and a closed position in which the lubricant from the positive displacement pump is prevented from entering the relief passage; and
        a biasing element coupled to the rod for maintaining a biasing force on the pressure relief valve, the pressure relief valve being maintained in the closed position when the biasing force exceeds a fluid force exerted by the lubricant on the pressure relief valve, and the pressure relief valve moving into the open position when the fluid force on the pressure relief valve exceeds the biasing force on the pressure relief valve;
        a catch, the catch holding the pressure relief valve in the open position once the fluid force exerted by the lubricant on the pressure relief valve exceeds the biasing force on the pressure relief valve; and
    a divider block for distributing the lubricant from the pump to multiple lubrication points associated with one or more compressors.

2. The natural gas compressor lubrication system of claim 1, wherein the piston and the at least one seal are adapted to move in conjunction within the housing such that the inlet of the pressure relief valve is in fluid communication with the conduit.

3. The natural gas compressor lubrication system of claim 2, further comprising a rod attached to the piston; and
    the catch including a lever, wherein at least the lever is oriented at an acute angle to the rod, the lever providing a force on the rod to maintain the valve in the open position once opened until the lever is moved.

4. The natural gas compressor lubrication system of claim 1 in which the pressure relief valve assembly includes a switch activated by the valve opening that provides a signal upon the opening of the pressure relief valve.

5. The natural gas compressor lubrication system of claim 1 further comprising a visible indicator to indicate when the pressure relief valve is in the open position.

6. The natural gas compressor lubrication system of claim 5 wherein the visible indicator is coupled to the rod and extends from the housing when the pressure relief valve is in the open position.

7. The natural gas compressor lubrication system of claim 1 further comprising a switch that is activated by the valve opening to provide a signal that the pressure relief valve has opened.

8. The natural gas compressor lubrication system of claim 7 wherein the signal shuts down the natural gas compressor lubrication system.

* * * * *